(12) United States Patent
Sennoun et al.

(10) Patent No.: US 7,517,372 B2
(45) Date of Patent: Apr. 14, 2009

(54) INTEGRATED FUEL PROCESSOR SUBSYSTEM WITH QUASI-AUTOTHERMAL REFORMING

(75) Inventors: Mohammed E Sennoun, Pittsford, NY (US); Gerald E Voecks, Fairport, NY (US); Gary M Robb, Lima, NY (US); William H Pettit, Rochester, NY (US); Steven G Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 1030 days.

(21) Appl. No.: 10/788,155

(22) Filed: Feb. 26, 2004

(65) Prior Publication Data

US 2005/0188615 A1    Sep. 1, 2005

(51) Int. Cl.
*B01J 8/00* (2006.01)
(52) U.S. Cl. ............ 48/127.9; 422/211; 422/191; 431/7; 431/5; 431/10; 431/350; 431/351; 431/352; 431/353; 60/290; 60/39; 60/700

(58) Field of Classification Search ............... 422/168; 431/328; 48/197 R
See application file for complete search history.

(56) References Cited

U.S. PATENT DOCUMENTS

| 4,650,727 | A | | 3/1987 | Vanderborgh et al. ......... 429/19 |
| 5,004,592 | A | * | 4/1991 | Pinto ......................... 423/652 |
| 5,375,999 | A | * | 12/1994 | Aizawa et al. ............... 431/328 |
| 5,441,401 | A | * | 8/1995 | Yamaguro et al. ............. 431/4 |
| 6,521,204 | B1 | | 2/2003 | Borup et al. ................. 423/652 |
| 2003/0093950 | A1 | * | 5/2003 | Goebel et al. ............... 48/197 R |

* cited by examiner

*Primary Examiner*—Alexa D. Neckel
*Assistant Examiner*—Kaity V. Handal (57) ABSTRACT

The present invention includes an integrated fuel processor subsystem incorporating a thermal combustor, a catalytic combustor, a quasi-autothermal reactor (QATR) and a air-fuel-steam (AFS) mixer to provide a range of operating modes exhibiting performance between that of a pure steam reformer and a pure autothermal reformer to increase the flexibility of the fuel processor to handle transient system demands such as cold starts, suppress emissions and carbon formation and improve efficiency.

10 Claims, 12 Drawing Sheets

INTEGRATED FUEL PROCESSOR SUBSYSTEM WITH QUASI-AUTOTHERMAL REFORMING

FIELD OF THE INVENTION

The present invention generally relates to fuel processors, and more particularly to a fuel processor having a combustion system for rapid start of the fuel processor and a combustor for use in such a system.

BACKGROUND OF THE INVENTION $H_2$—$O_2$ fuel cells, particularly Proton Exchange Membrane (PEM) fuel cells, use hydrogen ($H_2$) as a fuel and oxygen (typically from air) as an oxidant to produce electricity. The hydrogen used in the fuel cell can be derived from the reformation of a hydrocarbon fuel (e.g., methanol or gasoline) in a primary reactor. For example, in a steam reforming process, a hydrocarbon fuel (such as methanol) and water (as steam) are ideally reacted in a catalytic reactor (commonly referred to as a "steam reformer") to generate a reformate gas comprising primarily hydrogen and carbon monoxide. An exemplary steam reformer is described in U.S. Pat. No. 4,650,727 to Vanderborgh.

For another example, in an autothermal reformation process, a hydrocarbon fuel (such as gasoline), air and steam are ideally reacted in a combined partial oxidation and steam reforming reactor (commonly referred to as an autothermal reformer or ATR) to generate a reformate gas containing hydrogen and carbon monoxide. An exemplary autothermal reformer is described in U.S. Pat. No. 6,521,204 to Borup et al. The reformate gas exiting the reformer, however, contains undesirably high concentrations of carbon monoxide, most of which must be removed to avoid poisoning the anode catalyst of the fuel cell. In this regard, the relatively high level of carbon monoxide (i.e., about 3-10 mole %) contained in the $H_2$-containing reformate exiting the reformer must be reduced to relatively low concentrations (e.g., less than 200 ppm, and typically less than about 20 ppm) to avoid poisoning the anode catalyst. Thus, a fuel processing system used in connection with a fuel cell typically employ secondary or CO cleanup reactors to achieve a stack-grade reformate stream.

As noted above, conventional steam reforming typically comprises introducing a mixed stream of a hydrocarbon fuel and steam into a catalyst bed that is maintained at operating temperature by an external heating source. Autothermal reforming, on the other hand, typically comprises introducing a mixed stream of air, steam and a hydrocarbon fuel into a reactor containing a catalyst bed with the necessary heat being supplied by an exothermic reaction between oxygen and the fuel. Ideally, a reformer will convert a hydrocarbon fuel into a $H_2$-containing reformate while maximizing the heat utilization and simultaneously minimizing the conversion temperature, methane production, and carbon formation. Further, for vehicular applications, the reformer will ideally achieve this conversion in a compact reactor system that can be closely integrated with the fuel cell system that will be consuming the hydrogen produced.

Both conventional steam reforming and autothermal reforming have certain performance limitations inherent in their heat utilization schemes. For example, while steam reformers increase efficiency by utilizing heat from hot waste streams in the endothermic catalysis, the design of autothermal reformers precludes recovering much of the waste heat and reduces their efficiency. However, while heat transfer limitations slow the response of steam reformers to transient operation demands, autothermal reformers can more easily accommodate varying system demands. Further, steam reformers are typically larger than autothermal reformers, making autothermal more suitable for portable and vehicular applications.

It is known that the carbon monoxide, CO, level of the reformate exiting a reformer can be reduced by utilizing a so-called "water gas shift" (WGS) reaction wherein water (typically in the form of steam) is combined with the reformate exiting the reformer, in the presence of a suitable catalyst. Some of the carbon monoxide (e.g., as much as about 0.5 mole % or more) will survive the shift reaction so that the shift reactor effluent will comprise hydrogen, carbon dioxide, water, carbon monoxide, and nitrogen.

As a result, the shift reaction alone is typically not adequate to reduce the CO content of the reformate to levels sufficiently low (e.g., below 200 ppm and preferably below 20 ppm) to prevent poisoning the anode catalyst. It remains necessary, therefore, to remove additional carbon monoxide from the reformate stream exiting the shift reactor before supplying it to the fuel cell. One technique known for further reducing the CO content of reformate exiting the shift reactor utilizes a so-called "PrOx" (i.e., Preferential Oxidation) reaction conducted in a suitable PrOx reactor under conditions which promote the preferential oxidation of the CO without simultaneously consuming/oxidizing substantial quantities of the $H_2$ fuel or triggering the so-called "reverse water gas shift" (RWGS) reaction. About four times the stoichiometric amount of $O_2$ is used to react with the CO present in the reformate to ensure sufficient oxidation of the CO without consuming undue quantities of the $H_2$.

Primary reactors for gasoline or other hydrocarbons typically operate at high temperatures (i.e., about 600-800° C.), with water gas shift reactors generally operating at lower temperatures of about 250-450° C., and the PrOx reactors operating at even lower temperatures of about 100-200° C. Thus, it is necessary that the reformer, the water gas shift (WGS) reactor, and the PrOx reactor are each heated to temperatures within their operating ranges for the fuel processor in a start-up mode prior to operating as designed. During the start-up of a conventional fuel processor, however, the heating of various components is typically sequentially staged. This sequential approach to heating can lead to undesirable lag time for bringing the system on line. Alternately, external electrical heat sources (i.e., resistance heaters) may be employed to bring the components to proper operating temperatures more quickly, but this approach requires an external source of electricity such as a battery.

Accordingly, there exists a need in the relevant art to provide a fuel processor that can operate in a regime between a steam reformer and an autothermal reformer. Furthermore, there exists a need in the relevant art to provide a fuel processor capable of heating the various components while minimizing the consumption of electrical energy during startup and the reliance on catalytic reactions. And further, there exists a need for a fuel processor that can be used successfully with a range of hydrocarbon fuels and in a variety of transient operating conditions.

BRIEF SUMMARY OF THE INVENTION

The present invention relates to an integrated fuel processor including a thermal combustor (TC), a catalytic combustor (CC), a quasi-autothermal catalytic reformer (QATR), and an Air-Fuel-Steam mixer (AFS). The fuel processor, by integrating a multipurpose thermal combustor, a catalytic combustor and a QATR, provides the flexibility sufficient to handle, in an efficient manner, transient operational demands while suppressing or eliminating carbon formation to allow the fuel processor to operate at levels between pure steam reformer and pure autothermal reformer modes.

A fuel processor according to the present invention provides several rapid cold start/operation modes in which the multipurpose thermal combustor and the catalytic combustor may be utilized to provide $H_2$ to the associated fuel cell system quickly while preheating the various components to their desired operating ranges. A fuel processor according to the present invention also provides a normal operation mode in which fuel cell anode and cathode exhausts from an associated $H_2$—$O_2$ fuel cell may be mixed and introduced into the catalytic combustor to provided heat for the catalytic reformer.

DETAILED DESCRIPTION OF THE PREFERRED EMBODIMENT

Cold start and transient response expected present a design challenge for the onboard conversion of hydrocarbon fuels (reforming) to produce the hydrogen required for fuel cell operation especially in transportation applications. Ideally the fuel processor will be compact, highly efficient and have a rapid-start and good transient capability. In this regard, decreasing the size of the fuel processor will directly reduce the size and weight of the total fuel cell system and will also tend to improve the transient and start-up performance. Particularly in vehicular applications, an onboard fuel processor must have "cold start" and transient capabilities to meet the operating demands of the application while also allowing for efficient steady-state performance.

Figure 1:
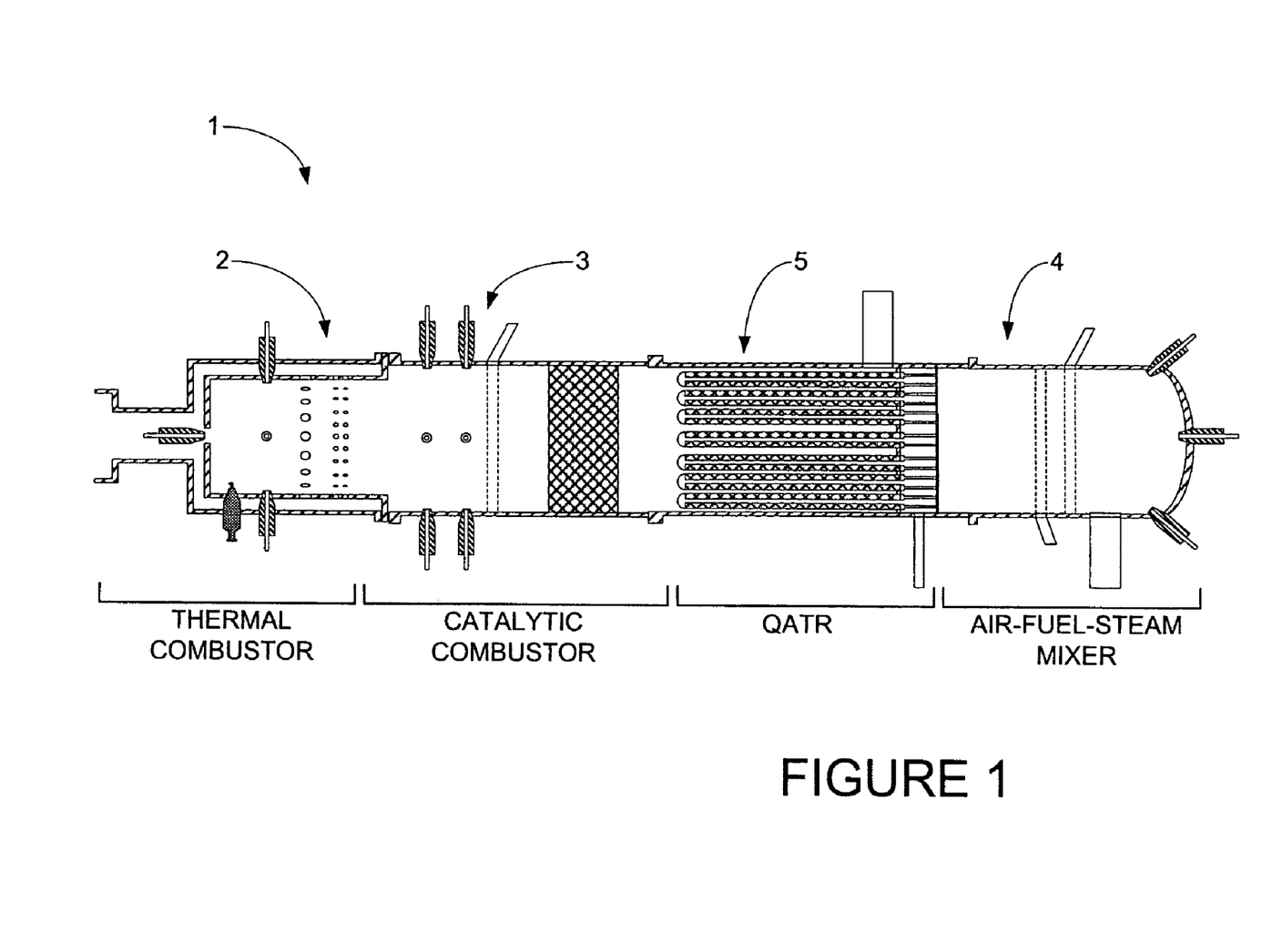
FIG. 1 provides a cross-sectional view of the fuel processor system in accordance with the present invention.

A fuel processor 1 according to the present invention, an embodiment of which is illustrated in FIG. 1, combines a multipurpose thermal combustor 2 with a catalytic combustor 3 in order to provide the required $H_2$ to the fuel cell stack while preheating a quasi-autothermal reactor (QATR) 5 to achieve an operating temperature such that a mixture of fuel vapor, steam and air supplied from an air-fuel-steam (AFS) mixer 4 are reacted in the QATR 5 to produce a $H_2$-containing reformate for use in a fuel cell or for reformate storage.

Figure 2:
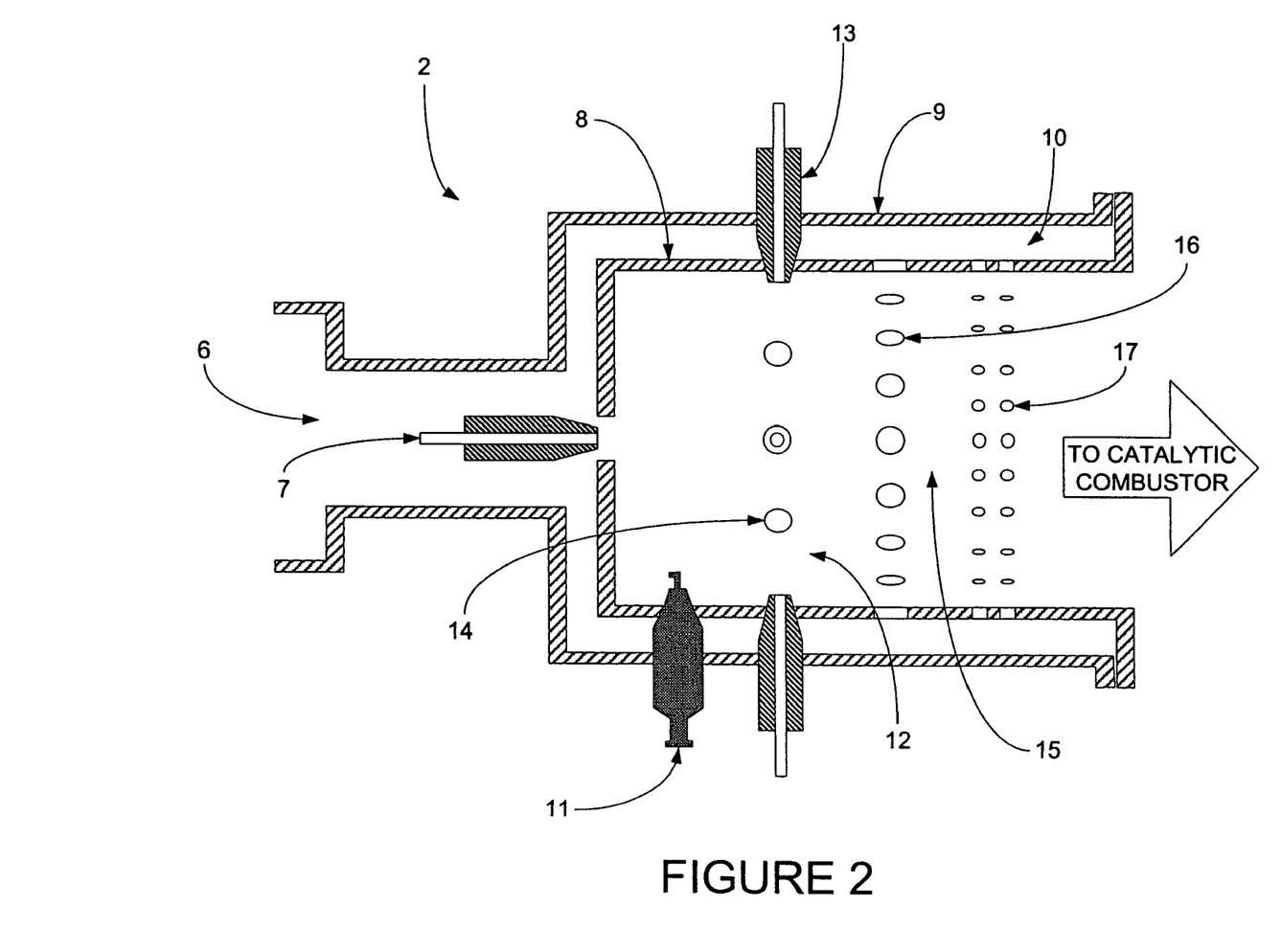
FIG. 2 provides a cross-sectional view of the thermal combustor shown in FIG. 1.

FIG. 2 illustrates a thermal combustor 2 suitable for use in a fuel processor according to the present invention. Air enters the thermal combustor through an air inlet 6. A portion of the air introduced may be combined with fuel introduced into the thermal combustor, preferably through a fuel injector 7, to form a lean air/fuel mixture in the lean section 12 of the thermal combustor. This lean air/fuel mixture may then be ignited by an ignition source, preferably a spark plug 11, or by an established flame, to produce a clean, non-sooting flame. Additional fuel and air can be introduced through secondary fuel injectors 13 and mix air inlets 14 formed in a liner 8 to support the lean flame.

The combustion products produced in the lean section flow into the cooling section 15 of the thermal combustor where they are preferably diluted and cooled by air entering through primary and secondary cooling air inlets 16, 17 from an air passage 10 defined between the thermal combustor liner 8 and the combustor outer casing 9. The combustion products are thereby cooled to a point that will permit the introduction of additional fuel without inducing auto ignition. This arrangement also allows the air passages 16, 17 to be utilized to reduce the external temperature of the thermal combustor 2.

Figure 3:
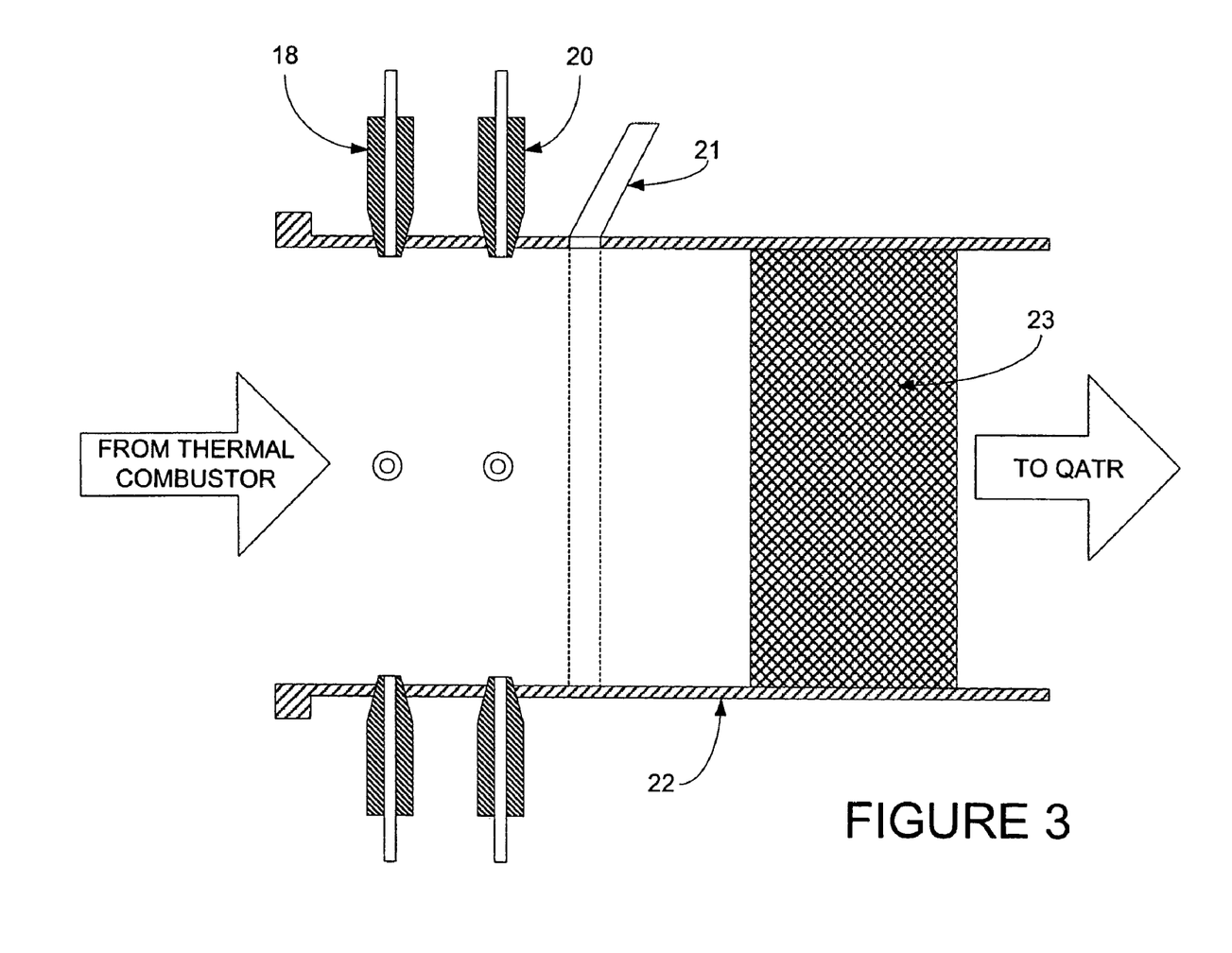
FIG. 3 provides a cross-sectional view of the catalytic combustor shown in FIG. 1.

With reference now to FIG. 3, water can also be introduced into the gas stream through one or more water injectors 18 arranged between the lean section and the catalytic portion or bed 23 of the catalytic combustor 3. The cooled combustion products or other gases from the cooling section 15 are then introduced into the rich section 19 of the thermal combustor 2 and additional hydrocarbon fuel is introduced into the gas stream through enrichment fuel injectors 20 and/or fuel vapor inlets 21 that permit the introduction of additional hydrocarbon fuel vapor and/or fuel cell anode effluent. Depending on the state of the fuel, i.e., liquid or vapor, and the available fuel sources, a variety of fuel inlets can be provided in the rich section 19 and used singly or in combination to produce a fuel-rich stream and/or an enriched combustion gas-rich stream.

In one embodiment, this enriched gas stream is then fed into a catalytic combustor where its components react with a catalyst provided in a catalyst bed 23 to produce a heated $H_2$-containing stream. This heated $H_2$-containing stream is then fed into the shell side of the quasi-autothermal reactor (QATR) 5, where it heats the exterior of the QATR tubes 30 to promote reformation of an air-fuel-steam mixture 41 flowing through the QATR tubes 50.

The role played by the catalytic combustor 3 in the fuel processor 1 is coordinated with the operation of the thermal combustor 2 to provide at least four distinct operating modes that are selected to address varying demands on the fuel processor system.

Figure 5:
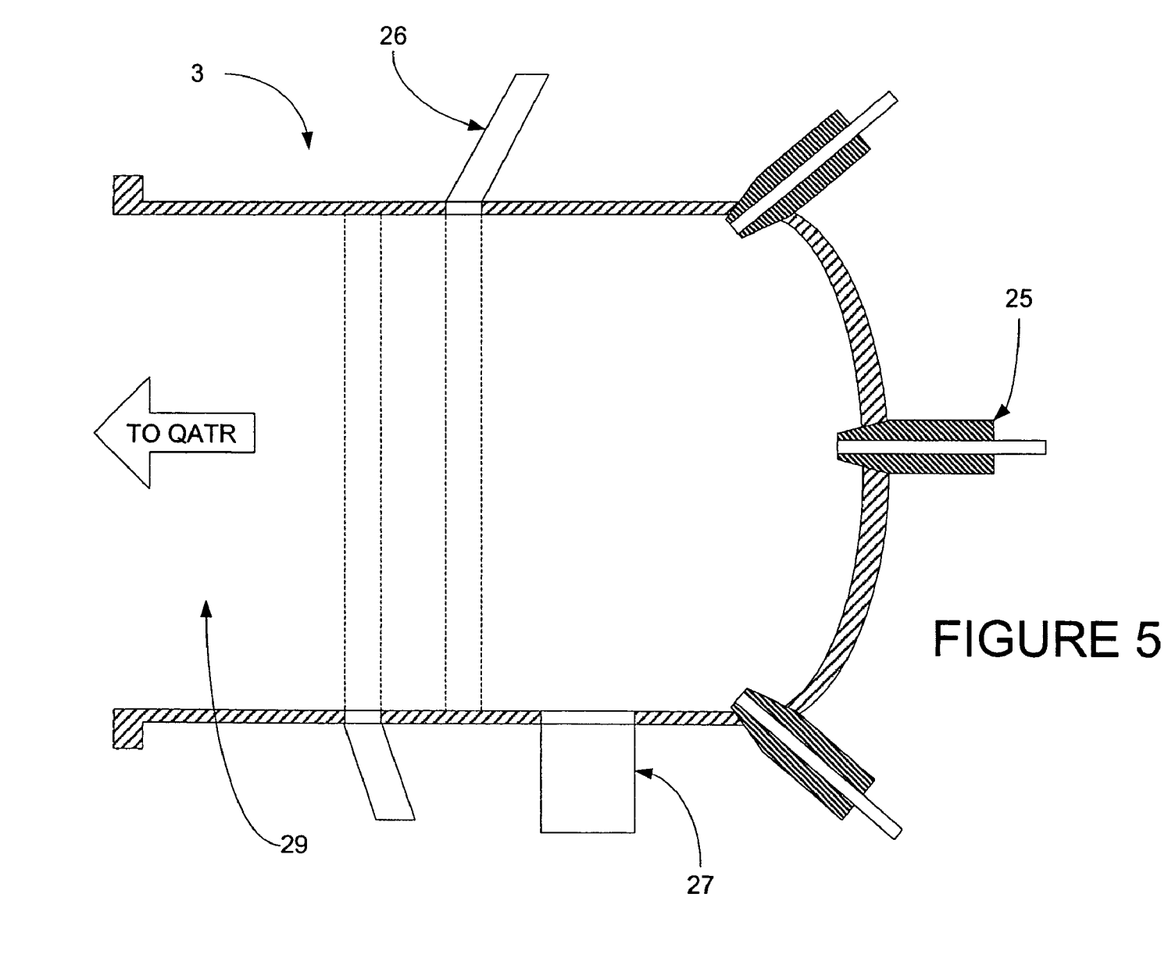
FIG. 5 provides a cross-sectional view of the Air-Fuel-Steam (AFS) Mixer shown in FIG. 1.

To operate efficiently, a reformer needs an appropriate mixture of fuel, typically one or more hydrocarbons, water vapor (preferably as steam) and air that provide the necessary reactants within predetermined stoichiometric and temperature ranges. In a fuel processor according to the present invention, such a mixture is prepared in an air-fuel-steam (AFS) mixer 4. Within the AFS mixer 4, fuel is vaporized, mixed with steam and air, and heated before being introduced into the QATR 5 without inducing auto-ignition and the associated gas phase carbon formation. As illustrated in FIG. 5, an AFS mixer 4 suitable for use in the fuel processor 1 includes a fuel inlet 25, preferably one or more fuel injectors, and either separate or combined air and steam inlets 26, 27. As those of ordinary skill in the art will appreciate, a variety of components and arrangements may be used to the achieve the necessary mixing and heating of the fuel-air-steam mixture including additional vaporization chambers, perforated distribution lines, and arrangements to promote mixing of the various streams. In any event, the AFS mixer 4 should be configured to ensure adequate mixing of the air, fuel and steam before the mixture is fed into the QATR 5.

The quasi-autothermal reformer (QATR) 5 is in combination with the thermal and catalytic combustors 2, 3 and the AFS mixer, forming a fuel processor 1 according to the present invention with flexibility to handle transient operation demands, to operate efficiently, and to reduce emissions and carbon formation. The designation "Quasi-Auto-Thermal Reactor" is utilized because this reactor may operate at modes between a pure partial oxidation reactor and a pure steam reformer. This design also permits the reformate gas to reach temperatures at the reforming exit that are high enough to achieve lower methane concentrations than those typically experienced with prior art reformers.

The present invention provides for the close integration of autothermal and steam reforming modes into a single fuel processor and provides for the combustion of fuel cell anode exhaust gas, usually combined with the cathode exhaust gas, to take place at a location adjacent to the QATR tubes 30 and, thus, provide adequate heat energy and temperature for reforming the air-fuel-steam mixture within the QATR tubes 30. Two advantages of the heat utilization in this manner are (1) no external combustor and heat exchangers are required to transfer heat to the fuel processor and (2) the direct combustion of the anode exhaust gas in the presence of the reformer provides a higher grade heat directly at the reactor surfaces to promote more efficient conversion.

This improved heat utilization allows the fuel processor to respond more quickly to transient operational demands without necessitating the introduction of excess air to the QATR to suppress carbon formation. Since various fuel cell operations will require different amounts of reformate, operations at different conversion efficiencies and temperatures, and different response to transient conditions, the actual fuel processor designs will necessarily vary in order to optimize the efficiency of the particular fuel cell system. It will be appreciated, therefore, that the particular configurations illustrated and discussed are representative only and should not be understood to unduly limit the scope of the invention. Indeed, a variety of configurations may be adapted to increase the heat utilization within the fuel processor including using combustor exhaust or reactor product gas streams for preheating and thereby improve system efficiency.

Figure 6:
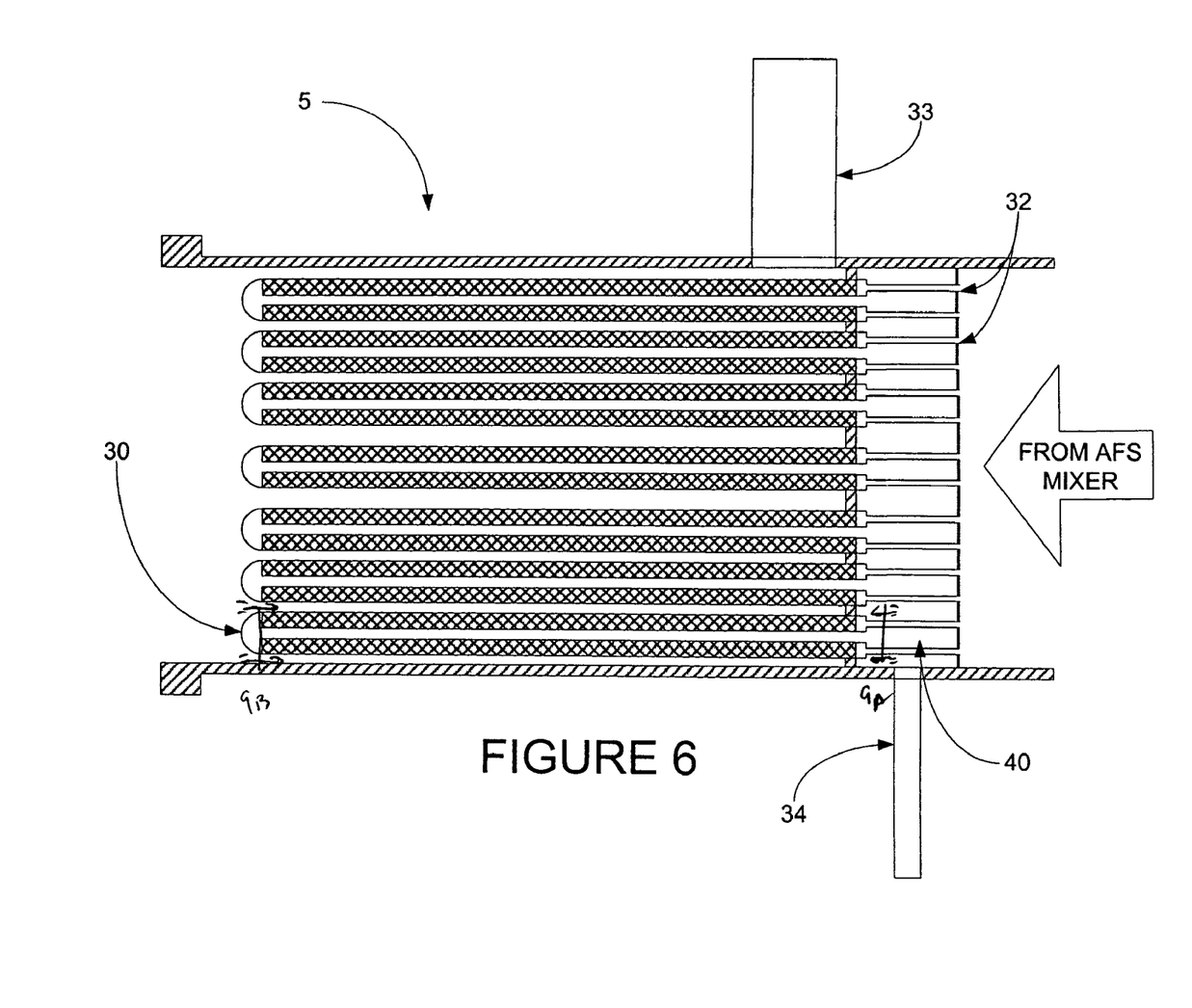
FIG. 6 provides a cross-sectional view of the Quasi-Autothermal Reactor (QATR) shown in FIG. 1.
Figure 7:
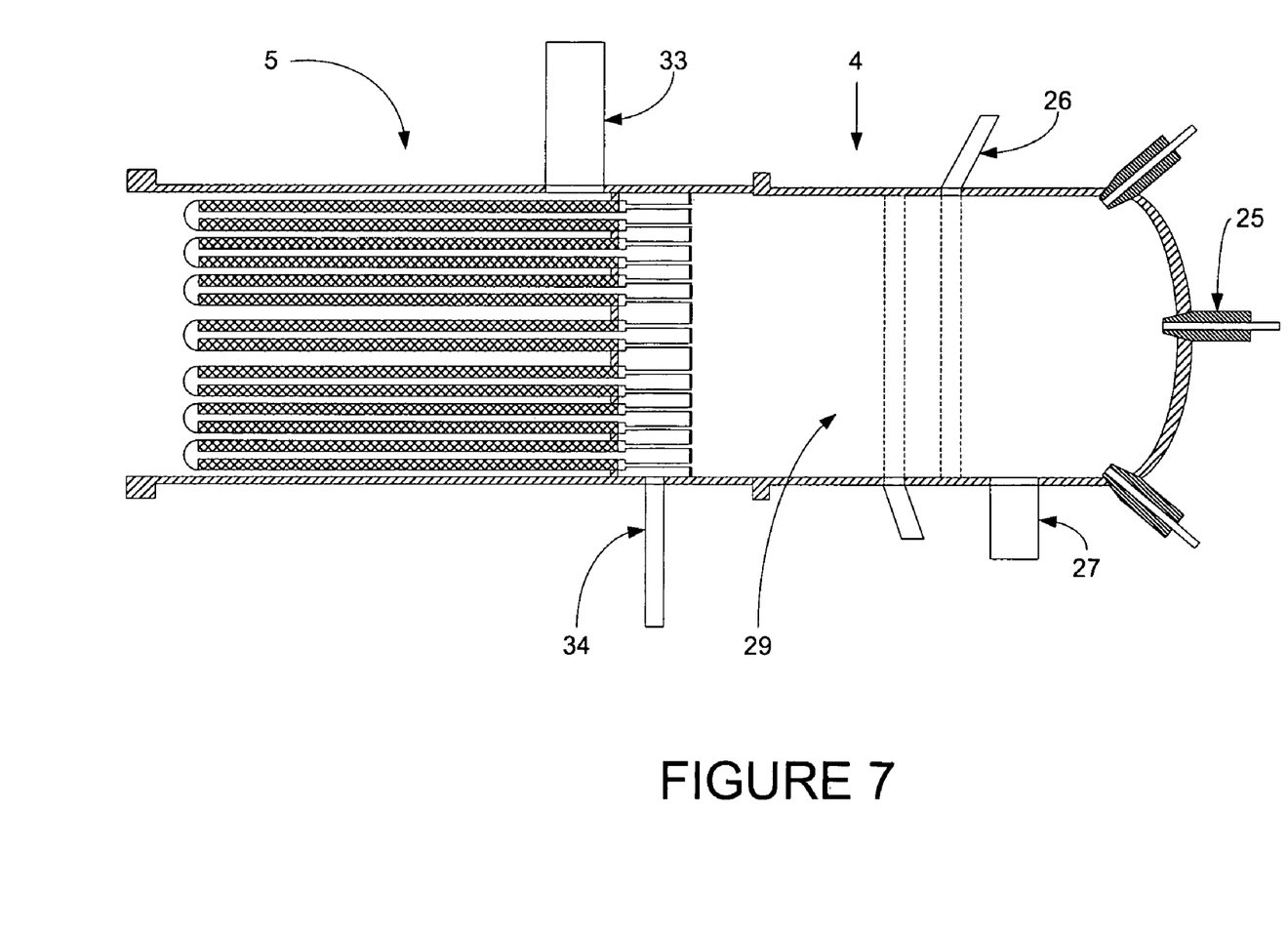
FIG. 7 provides a cross-sectional view of a combination of the Air-Fuel-Steam (AFS) Mixer and the Quasi-Autothermal Reactor (QATR) shown in FIGS. 5 and 6.

FIG. 6 illustrates the basic components of the QATR 5 including a casing 31 and a series of QATR tubes 30 surrounded by the heated exhaust from the catalytic combustor 3. After flowing past the QATR tubes 30 and transferring a portion of the heat energy to the QATR tubes 30, the heated stream from the catalytic combustor 3 is removed through an exhaust outlet 33.

Figure 8:
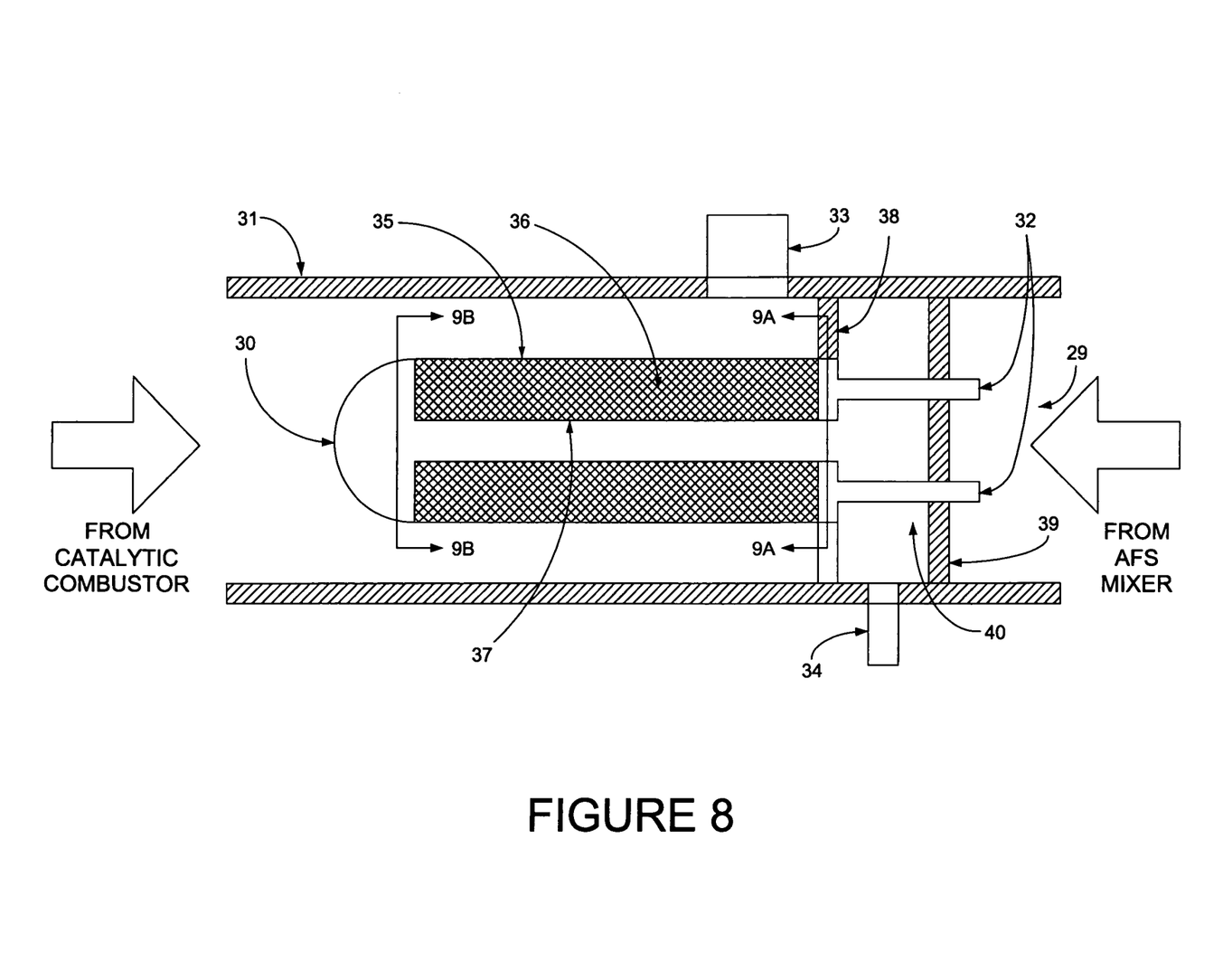
FIG. 8 provides a cross-sectional view of a simplified QATR.
Figure 11:
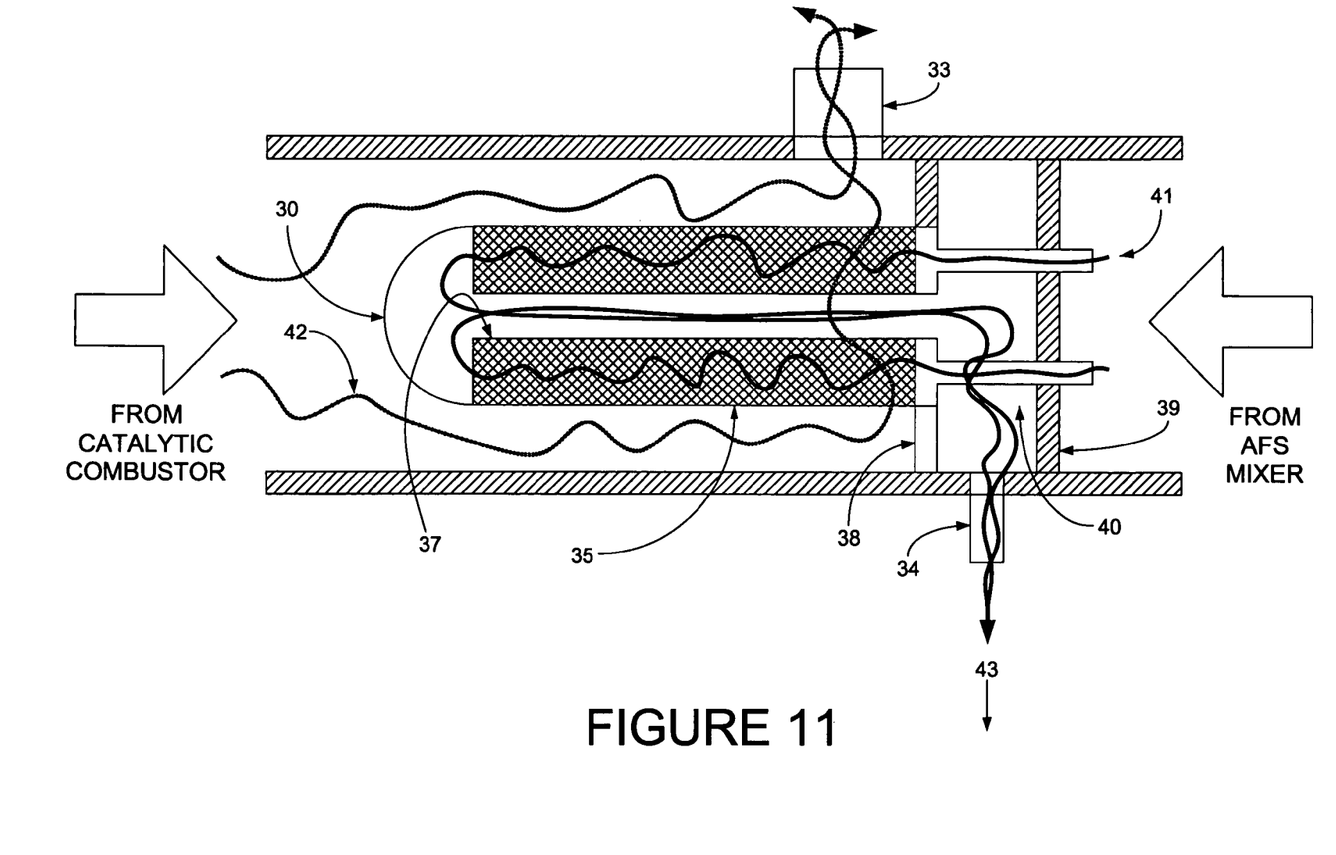
FIG. 11 illustrates the flow of the various gas streams through the simplified QATR of FIG. 8.
Figure 12:
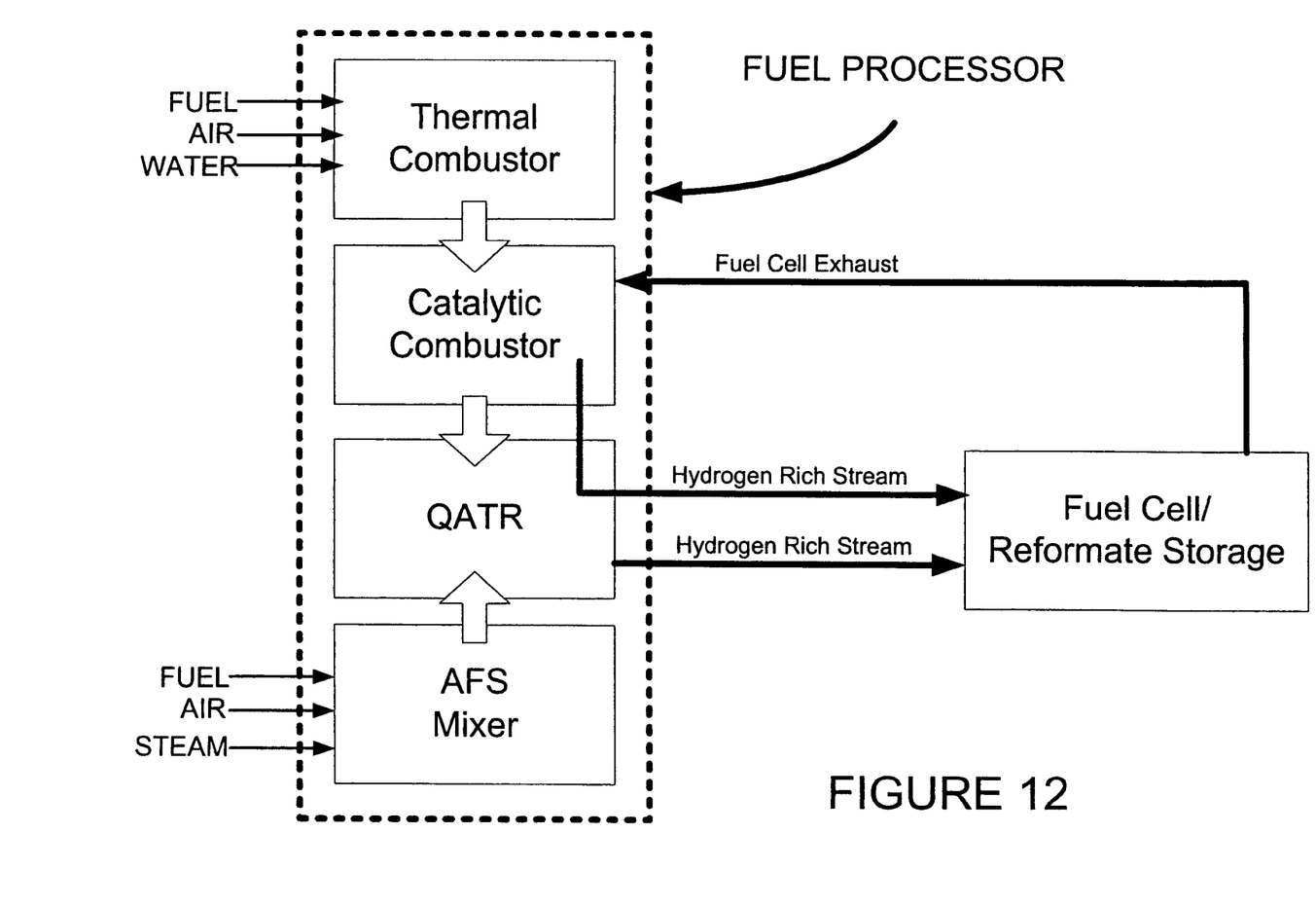
FIG. 12 illustrates the flow of reactants, air, fuel, steam and water into the fuel processor, the flow of reactants within the fuel processor, and the availability of $H_2$-enriched streams from both the QATR and the catalytic combustor for use in a fuel cell or reformate storage.

FIGS. 8 and 11 illustrate the various components and flow paths within one embodiment of the QATR 5 using a single QATR tube 30 for clarity. Each QATR tube 30 has one or more inlets 32 for introducing an air-fuel-steam (AFS) mixture 41 from the AFS mixer 4 into an annular space defined between an outer tube 35 and an inner tube 37 that contains an appropriate catalyst 36. The AFS mixture 41 preferably flows through the outer annular portion of the QATR tube 30 in a countercurrent direction relative to the heated stream 42 flowing along the exterior surface of the QATR tube 30. Although not illustrated, the heat transfer characteristics can be modified through the use of fins or other structures to increase the available heat transfer surface and improve the overall efficiency. As the AFS mixture 41 reaches the end of the QATR tube 30, it is directed into the inner tube 37 that returns the reformed $H_2$-enriched AFS mixture 41 to a reformate outlet 34 from which it can be delivered to an associated fuel cell stack or syn gas storage. Perforated plates 38, 39 or other structures may be used to provide a reformate collection area 40 that is separate from the AFS mixer chamber 29.

Figure 9A:
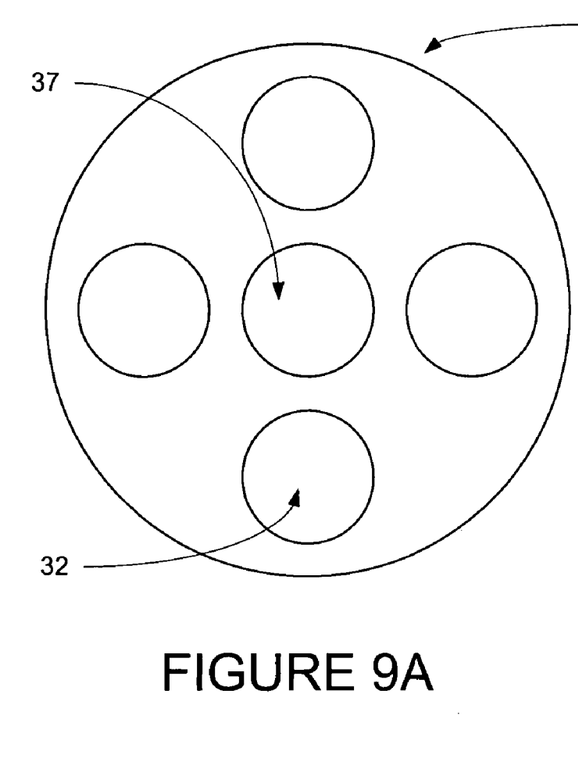
FIGS. 9A-B provide detail of QATR tubes shown in FIG. 8.
Figure 9B:
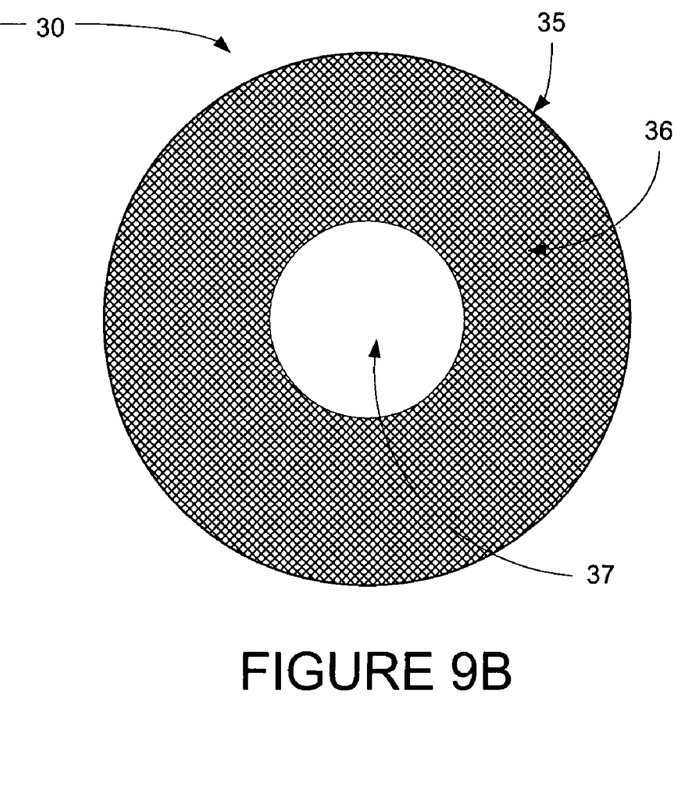

FIGS. 9A-B illustrate a preferred configuration of different cross sections of the QATR showing the individual QATR tubes 30. Each QATR tube 30 comprises two concentric tubes 35, 37 with a catalyst 36 arranged between the inner and outer tubes 35, 37. Each QATR tube 30 is fed a mixture of air-fuel-steam 41 through a plurality of small tubes 32 that connect the AFS mixer 4 and the individual QATR tubes 30 and the reformed AFS mixture 41 is removed as stream 43 through the inside of the inner tube 37 and passed to a reformate outlet 34.

Figure 10A:
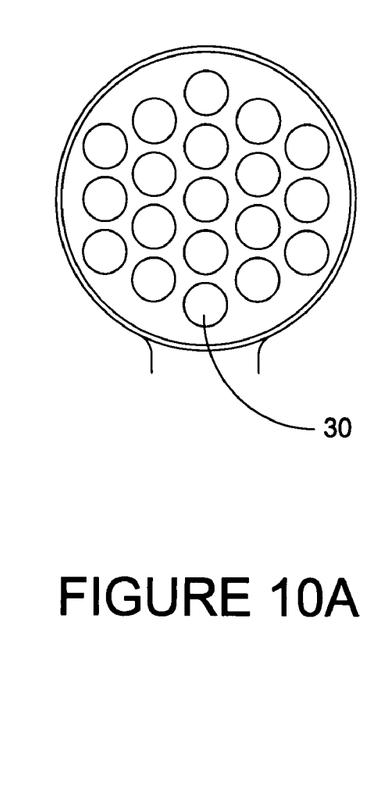
FIGS. 10A-C provide additional detail regarding the QATR tube array shown in FIG. 6.
Figure 10B:
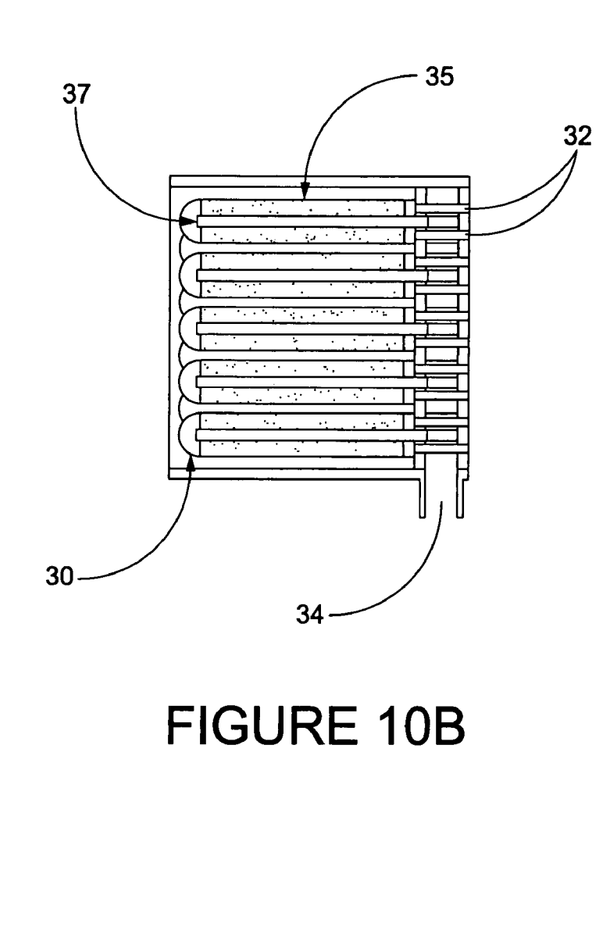
Figure 10C:
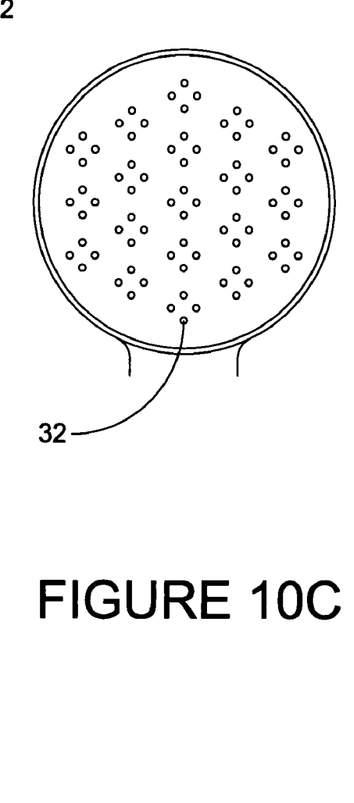

FIG. 10A shows an end view with tube 30; 10B shows a side view of outer tubes 35 and inner tubes 37; and 10C shows an end view with small tubes 32 connecting the AFS mixer 4 and the QATR tubes 30.

Although not presently preferred, it is possible to configure the QATR tubes 30 so that the AFS mixture 41 is introduced into an inner tube 37 filled catalyst with the return flow of reformed AFS mixture being achieved in the outer tube 35. Similarly, the QATR 5 and catalytic combustor 3 can be arranged to provide for a co-current flow of the combustion stream 42 and the AFS mixture 41. Indeed, there are a large number of possible configurations for the individual QATR tubes 30 that may be used in a fuel processor according to the invention so long as they permit heat transfer from the exhaust stream to promote an increased degree of reformation as the AFS mixture 41 passes through the catalyst bed.

The fuel processor according to the present invention, and its individual components, may be operated in a variety of modes to achieve different operational objectives.

One mode provides for cold-start processes in which the objectives are to 1) provide rapid production of $H_2$ for use in the fuel cell and 2) use hot combustion products to preheat other reactors for reforming operations. The thermal combustor 2 can operate in three distinct modes corresponding to different cold start strategies. In the first case the thermal combustor 2 and/or a portion of the catalytic combustor 3 may be divided, for convenience, into three sections, a lean section 12, a cooling section 15, and a rich section 19. In a "Lean-Cool-Rich" (LCR) start-up mode combustion products from a lean flame in the lean section are cooled by air dilution to reduce the temperature sufficiently to permit additional fuel to be added to the stream in the rich section without inducing auto ignition of the additional fuel. This operating mode produces a preheated stream with an appropriate oxygen/carbon (O/C) ratio that can be reacted in the catalytic combustor 3 using a partial oxidation catalyst to produce a heated stream including CO and $H_2$ while simultaneously preheating the QATR reactor 5.

In a "Rich Start with Water Spray" start-up mode, combustion products from a rich flame in the thermal combustor 2 are cooled by liquid water injection through injectors 18 to produce a preheated stream that is then fed into the downstream catalytic combustor 3. In this mode, however, the catalytic combustor 3 can be operated as a catalytic steam reformer because the thermal partial oxidation in the thermal combustor 2 provides the preheating and steam generation required for steam reforming.

In a "Rich Start Without Water Spray" start-up mode, combustion products comprising CO and $H_2$ from a rich flame in the thermal combustor 2 are fed into the catalytic combustor 3. In this instance, the catalytic combustor 3 operating as a partial oxidation reactor and is used to complete the combustion, reduce emissions and provide more efficient fuel conversion.

After start-up has been achieved and the fuel processor has reached operating temperature, the anode and cathode exhaust streams from the associated fuel cell are combined in the thermal combustor 2 and then fed into the catalytic combustor 3 to produce a heated stream comprising $CO_2$ and $H_2O$ that can be used to heat the QATR tubes 30. Further, the catalytic combustor 3 and QATR exhaust streams 42 can be utilized to vaporize fuel and water or preheat one or more of the air, steam, anode exhaust and cathode exhaust streams.

A fuel processor according to the present invention provides both the apparatus and the method for incorporating two alternative reforming methods and selectively combining them to utilize the advantages of both in a single subsystem. By supplying a portion of the heat required for steam reforming at the inlet (and consuming a small amount of fuel when the external heat is inadequate) the external heat load for steam reforming will be reduced and transient demands may be met more easily. Similarly, if external firing at the reformer exit can supply additional heat (energy not provided by the fuel consumed in the reactor inlet) needed to complete the fuel conversion, the balance of the fuel conversion more closely reflects the efficiencies of a steam reforming operation. The external firing can be provided by waste heat and energy supplied from the balance of the operation, namely the fuel cell stack and the waste heat from the fuel cell engine system.

Thus, during steady state operation, the fuel processor operates primarily like a steam reformer and reduces fuel consumption compared to autothermal operation to improve efficiency. During transient and start up operations, however, the fuel processor operates more like an autothermal reformer (ATR), thereby increasing fuel consumption but allowing for rapid system response to changing conditions and decreasing the time necessary to reach the more efficient steady state operation. This combined or hybrid operation can also be provided by a significantly smaller reactor when the preferred balance of reaction processes is achieved.

As will be appreciated, there are many configurations or arrangements that can be utilized to achieve an effective combination and integration of the two reforming processes into a single fuel processor. Indeed, a "reactor" may actually include a series of reactors arranged to more effectively integrate the shared load of heat production and utilization in the fuel processing. Various designs present different approaches that address options in the control of key reactions leading to the successful conversion of fuel while 1) suppressing or eliminating carbon formation, 2) achieving high utilization of heat generated external to the reactor, 3) reducing the amount of air required to achieve the desired O/C ratio at the reactor inlet, 4) optimizing heat transfer surface area and minimizing size, and 5) providing for a rapid response to changes in the demand for reformate.

Figure 4:
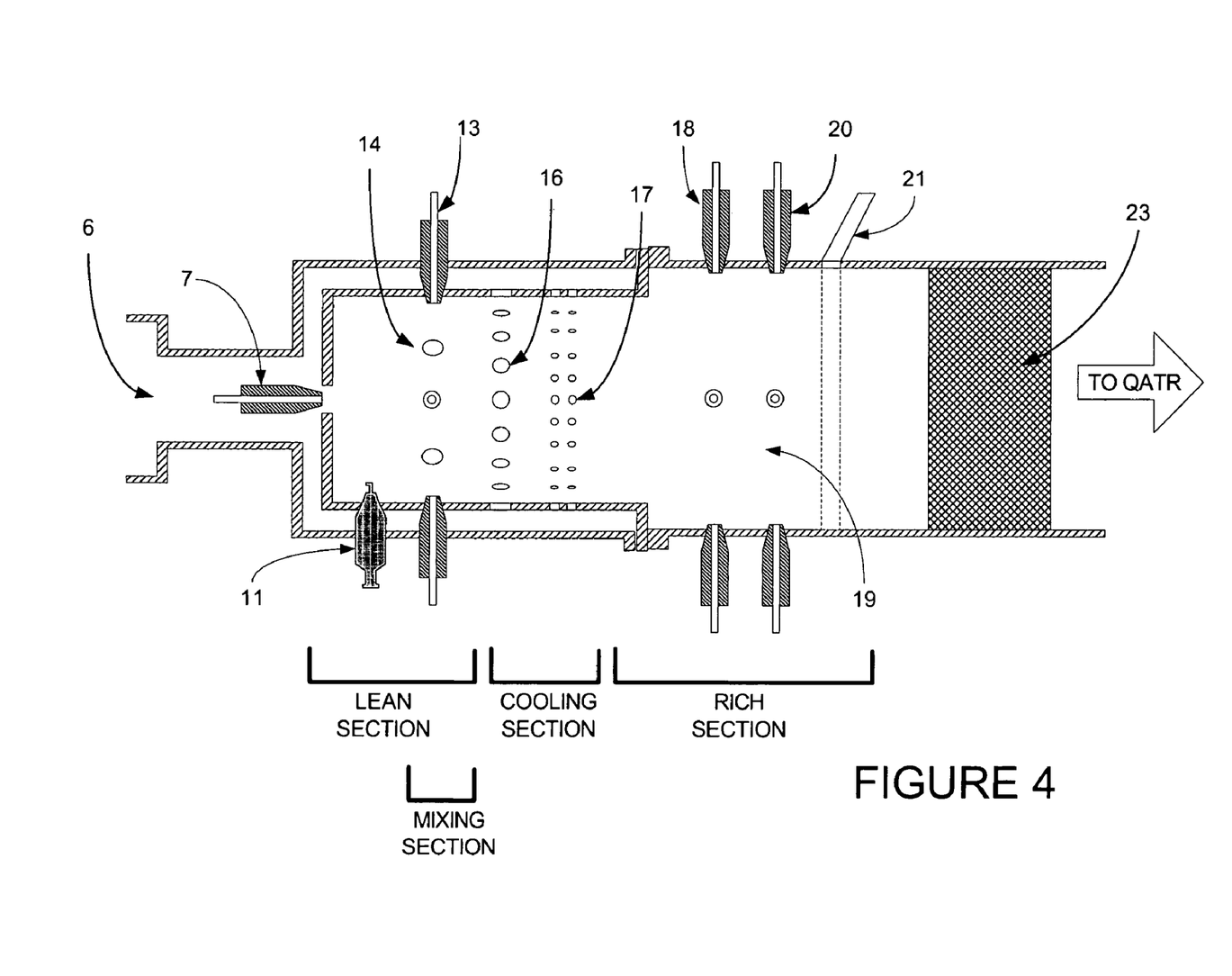
FIG. 4 provides a cross-sectional view of the combination of the thermal combustor and the catalytic combustor shown in FIGS. 2 and 3.

As used herein, the term "lean section" designates an upstream portion of the thermal combustor 2 including a generally lean or stoichiometric flame section, preferably followed by a mixing subsection including a plurality of mixing holes 14 as shown in FIG. 4. Similarly the term "cool section" designates a region downstream from the lean section that provides for the injection of cooling gas through one or more sets of cooling inlets 16, 17 as shown in FIG. 4. If provided, a preferred configuration includes mixing holes 14 sized and arranged within the mixing section to provide mixing jet penetration into a central core region of the mixing section and thereby provide the quantity of air necessary to achieve the targeted equivalence ratio and temperature range within the lean section. Similarly, it is preferred that a first set of cooling holes 16 are sized and arranged within the cooling section to provide cooling jet penetration to a central core region of the cooling section, a second set of cooling holes 17 are sized and arranged within the cooling section to provide cooling jet penetration into a middle region of the cooling section, and a third set of cooling holes are sized and arranged to provide cooling jet penetration to an outer region of the cooling section. The designation of the various sets of cooling holes is not required and it is certainly possible for a "set" of cooling holes to include holes sized and arranged to achieve varying degrees of cooling jet penetration or for the various sets of cooling holes provided in the cooling section to be arranged in different sequences.

While certain features of the invention have been illustrated and described in this application with reference to a preferred embodiment, many modifications and changes will occur to those skilled in the art. It is to be understood, therefore, that the following claims are not necessarily restricted to the precise embodiments illustrated and described herein, but are intended to cover all those modifications and changes as fall within the spirit of the invention.

We claim:

1. An apparatus for producing hydrogen from hydrocarbon fuels comprising a thermal combustor, a catalytic combustor, and a catalytic reformer, wherein:
   the thermal combustor includes a combustion zone, a cooling zone, and an enriching zone;
   the combustion zone providing:
   a first fuel inlet and a first gas inlet for introducing a ratio of a first hydrocarbon fuel and a first oxygen-containing gas into the combustion zone, the ratio being controllable to provide combustion of the first hydrocarbon fuel within the combustion zone;
   an ignition source for inducing combustion of the first hydrocarbon fuel and the first oxygen-containing gas to produce an exhaust stream that flows from the combustion zone into the cooling zone;
   the cooling zone providing one or more inlets selected from a group consisting of a first water inlet and a second gas inlet through which at least one fluid is injected into the exhaust stream to produce a cooled exhaust stream that is fed into the enriching zone;
   the enriching zone providing a second fuel inlet for introducing a second hydrocarbon fuel into the cooled exhaust stream to produce an enriched exhaust stream that is fed into the catalytic combustor;
   the catalytic combustor providing a first catalytic substrate upon which a first catalyst is supplied, the first catalyst selected to combust a portion of the enriched exhaust stream and thereby produce a second exhaust stream, the second exhaust stream being fed into the catalytic reformer; and
   the catalytic reformer includes:
   an inlet for receiving a gaseous feed mixture of a third hydrocarbon fuel, a second oxygen-containing gas and steam into an enclosed catalytic region, the catalytic region being heated by the second exhaust stream,
   the catalytic region providing a second catalytic substrate upon which a second catalyst is supplied, the second catalyst selected to reform the feed mixture to produce a hydrogen-containing reformate stream, an outlet for removing the reformate stream from the catalytic region, and an exhaust outlet for removing the second exhaust stream from the catalytic reformer.

2. An apparatus for producing hydrogen from hydrocarbon fuels according to claim 1, wherein the first and second oxygen-containing gases are air and the first, second and third hydrocarbon fuels are substantially identical.

3. An apparatus for producing hydrogen from hydrocarbon fuels according to claim 1, wherein the apparatus further comprises:

a fuel cell, the fuel cell being configured to receive a portion of the reformate stream into an anode chamber and a fourth oxygen-containing gas stream into a cathode chamber for the production of electricity.

4. An apparatus for producing hydrogen from hydrocarbon fuels according in the claim 3 wherein the fourth oxygen-containing gas comprises air.

5. An apparatus for producing hydrogen from hydrocarbon fuels according to claim 1, further comprising:

an air-fuel-steam (AFS) mixer, wherein the AFS mixer having a mixing chamber, a gas inlet for introducing the second oxygen-containing gas into the mixing chamber, a fuel inlet for introducing the third hydrocarbon fuel into the mixing chamber, and a steam inlet for introducing steam into the mixing chamber;

the air inlet, fuel inlet, steam inlet and the mixing chamber being arranged and configured to promote mixing of the second oxygen-containing gas, the third hydrocarbon fuel and the steam to produce the gaseous feed mixture; and a feed mixture outlet in fluid communication with the catalytic reformer for introducing the feed mixture into the catalytic reformer.

6. An apparatus for producing hydrogen from hydrocarbon fuels according to claim 5, wherein the catalytic reformer further comprises:

a casing, the casing providing an inlet for receiving the second exhaust stream, providing an outlet for removing the second exhaust stream, and enclosing a plurality of reformer tubes arranged so that an exterior surface of the reformer tubes is contacted and warmed by the second exhaust stream;

wherein each of the reformer tube includes a feed mixture inlet for receiving the feed mixture from the AFS mixer, a catalytic region in which the feed mixture contacts the second catalyst to produce the reformate stream and a reformate outlet for removing the reformate stream from the reformer tube.

7. An apparatus for producing hydrogen from hydrocarbon fuels according to claim 6, wherein each of the reformer tubes further comprises:

a first tube providing the exterior surface; and a second tube arranged within the first tube to define a space therebetween.

8. An apparatus for producing hydrogen from hydrocarbon fuels according to claim 7, wherein the catalytic region is disposed within the space between the first tube and the second tube.

9. An apparatus for producing hydrogen from hydrocarbon fuels according to claim 7, wherein the catalytic region is disposed within the second tube.

10. An apparatus for producing hydrogen from hydrocarbon fuels according to claim 7, wherein the space defined between the first tube and the second tube is substantially annular.

* * * * *